July 3, 1956

C. W. ADAMS ET AL 2,752,689

TOOTH SIZE AND FORM INDICATOR

Filed Oct. 13, 1951

INVENTOR.
CLAUDE W. ADAMS
WILLIAM O. WARREN
BY

July 3, 1956

C. W. ADAMS ET AL 2,752,689

TOOTH SIZE AND FORM INDICATOR

Filed Oct. 13, 1951

*INVENTOR.*
CLAUDE W. ADAMS
WILLIAM O. WARREN

BY

United States Patent Office 2,752,689
Patented July 3, 1956

2,752,689

TOOTH SIZE AND FORM INDICATOR

Claude W. Adams, York, and William O. Warren, Mount Wolf, Pa., assignors to The Dentists' Supply Company of New York, New York, N. Y., a corporation of New York Application October 13, 1951, Serial No. 251,216

5 Claims. (Cl. 33—174)

This invention relates to a tooth size and form indicator and, more particularly, to a simple and efficient indicator or guide for use especially by a dentist to determine the most suitable size and most pleasing form or shape of artificial tooth to be used in an intra-oral restorative device such as a partial or complete denture for any individual patient.

In denture prosthesis, it is a generally accepted principle that normal cases show evidence of quite a distinct relationship between the form and size of a person's face and the form and size of the upper central teeth of said person. As to the size, there appears to be a practical ratio of 1:16 between the widths of the upper central teeth and the person's face and a ratio of 1:20 between the length of the upper central teeth and the face of a normal person. As to the shape of the upper central teeth and the face of any individual normal person, it appears in general, for example, that a person having a tapering face has tapering upper central teeth, a person having a substantially square shaped face has substantially square upper central teeth, and an ovoid shaped face correspondingly has substantially ovoid shaped upper central teeth. There are other compound or combination shapes in addition to the foregoing such as square-tapering, square ovoid, tapering-ovoid, etc.

These principles are commonly referred to by the dental profession as the principles of face form and tooth harmony, said principles having been used extensively by the dental profession as general guides in the selection of artificial teeth which will best be suited to any individual patient.

Some experience is required to determine accurately the most suitable size and shape or form of teeth for various patients and, in order to facilitate the employment of the aforementioned principles by dentists so as to insure accuracy and harmony in the selection of artificial teeth, a variety of devices have been developed in the past in an effort to make suitable facial form or shape comparisons and facial measurements essential in the application of the aforementioned principles when applying them to various patients. Some of these devices have been relatively complex and expensive and have required considerable skill and education in regard to the use of said devices. The requirement of such skill and education has been somewhat discouraging to the wide adoption of these devices, with the result that the majority of the dental profession have not extensively adopted the devices in their practice to solve the problems of selecting artificial teeth.

It is an object of the present invention to provide a simple and inexpensive tooth selection indicator or guide which may be used especially by dentists to determine quickly and directly not only the length and width of upper central incisor teeth required by any individual patient but the form or shape of the tooth best suited to said patient may also simultaneously be quickly determined with accuracy.

It is another object of the invention to provide an indicator or guide for the aforementioned purposes which may be maintained in a clean, sterile condition with little effort.

It is still another object to provide an indicator or guide of this nature with indicia readable directly relative to an individual patient's face to determine the length and width of central incisor teeth which correspond to the size of the patient's face, said indicia being such that any selected indicia will indicate directly the size of upper central incisor teeth best suited to said patient.

It is still a further object of the invention to provide a simple indicator or guide which may be held directly against the face of any individual patient and means adjustably positionable on said guide may be manipulated for purposes of quickly and accurately indicating the shape or form of tooth best suited to the patient, said means being operable not only to determine commonplace face and tooth shapes and forms but also relatively complex shapes and forms which are less prevalent among average normal patients.

Details of the foregoing objects and of the invention as well as other objects thereof are set forth in the following specification and illustrated in the accompanying drawings forming a part thereof.

Figure 2:
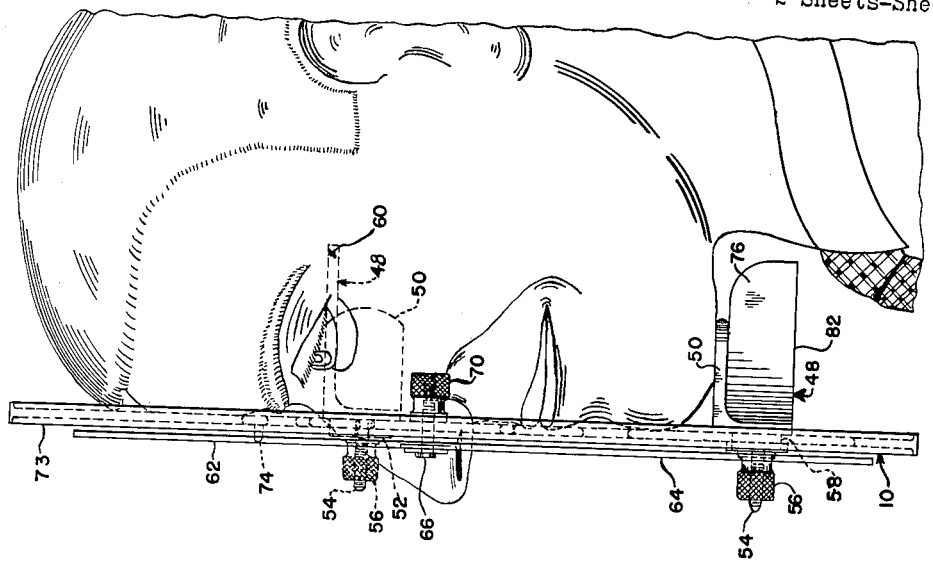
Fig. 2 is a view similar to Fig. 1 but illustrating the indicator or guide and patient in side elevation.
Figure 1:
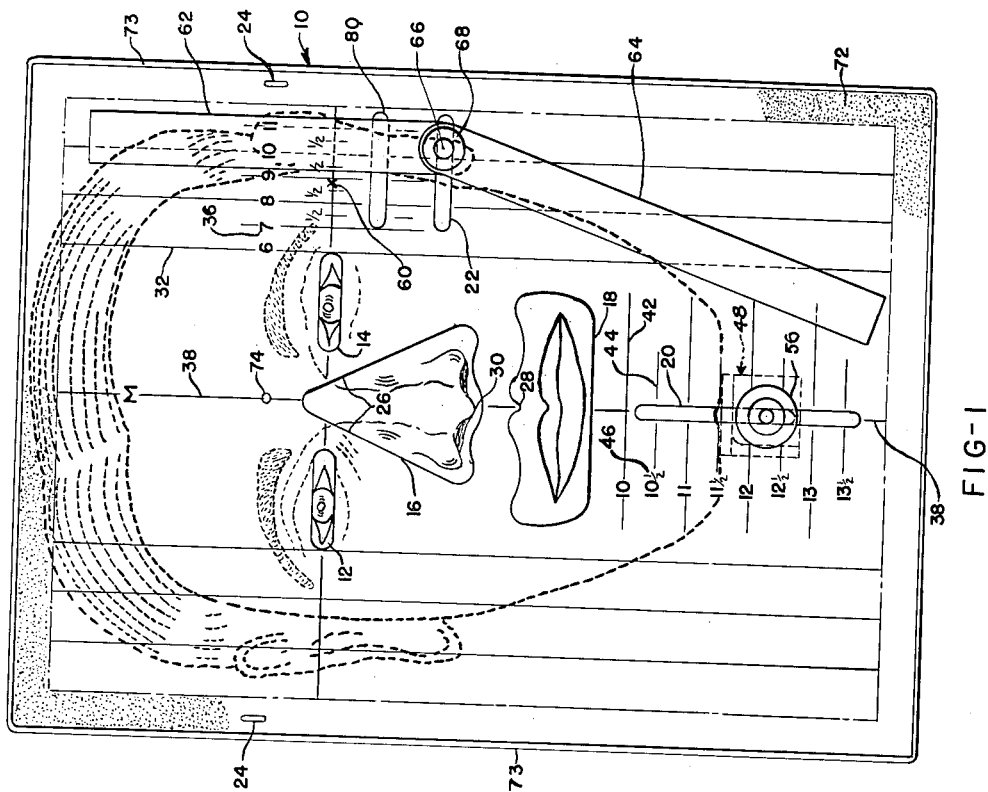
Fig. 1 is a front elevation of a tooth selector indicator or guide embodying the principles of the present invention and shown in operable position against the face of a patient.

The tooth selector indicator or guide embodying the principles of the present invention comprises a guide member 10 which is preferably transparent and may be formed from any suitable relatively rigid material such as a sheet of methyl methacrylate or other transparent synthetic resin. Obviously, glass or other rigid and suitably transparent material may be used. The member 10 readily lends itself to being molded either by injection or compression processes and, by using such molding process, all desired openings and indicia, to be described, may simultaneously be formed. The length and width of the member 10 are greater than the length and width of the head of an average patient and, in accordance with the principles of the invention, the member 10 is held by either the patient or the dentist directly against the face of a patient as illustrated in Figs. 1 and 2.

In order that the member 10 may be placed as closely as possible against the face of the patient and parallel thereto, as well as for other purposes to be described, the member 10 is provided with a pair of longitudinally aligned pupillary slots 12 and 14, a nose receiving aperture 16, and a mouth or lip receiving opening 18. The lower portion of the member 10 is also provided with a normally vertically extending slot 20 and a shorter normally horizontally extending slot 22 is formed adjacent one side edge of the member 10.

The guide member 10 may also be provided with any suitable means to facilitate holding the same against the face of a patient. One form of such means is illustrated, in Figs. 1 through 3, as small apertures 24 adjacent opposite sides of the member 10 and to which the ends of an elastic band, for example, may be attached, the band extending around the back of the head of the patient so as temporarily to hold the guide member against the face of the patient. Other exemplary holding means, not illustrated, may be used such as spectacle type temple bars, for example. The angularly related sides or edges 26 of the nose aperture 16 may also engage the sides of the nose of the patient and somewhat facilitate the holding of the guide member in position against the face of the patient.

It is essential for purposes of making accurate measurement that the guide member 10 be oriented relative to certain basic features of the patient's face to form a basis from which measurements are taken. To achieve such orientation, the guide member is placed against the face of the patient and the pupillary slots 12 and 14 are aligned with the pupils of the patient's eyes when the eyes are directed forwardly of the face. This establishes the guide member in basic vertical direction relative to the face. The mouth receiving opening 18 is provided with a small pointed projection 28 comprising an indicator which is aligned relative to the septum 30 of the nose of the patient and, if necessary, the member 10 is moved horizontally within the plane of the member so that the projection 28 may be brought into alignment vertically below the septum 30 while maintaining the pupillary slots 12 and 14 in alignment with the pupils of the patient's eyes. These operations will thus establish the guide member 10 in basic oriented relationship relative to the patient's face for purposes of establishing a basis from which measurements of suitable artificial teeth may be made and particularly the upper central teeth.

The guide member 10 is relatively light in weight and may be held in the aforementioned oriented relationship with the patient's face by one hand of the dentist, for example, or by the patient. The holding means 24 referred to above may also be employed. The dentist then preferably stands at about arm's length away from the patient's face directly in front of the guide member and observes the patient's face through said guide member. The dentist can then readily ascertain whether or not the guide member is in basic orientation particularly with the patient's eyes and septum of the nose. The dentist is now in a position to directly read the width and length of the upper central teeth best suited to the patient, said measurements being obtained directly in millimeter readings as will now be described.

Figure 3:
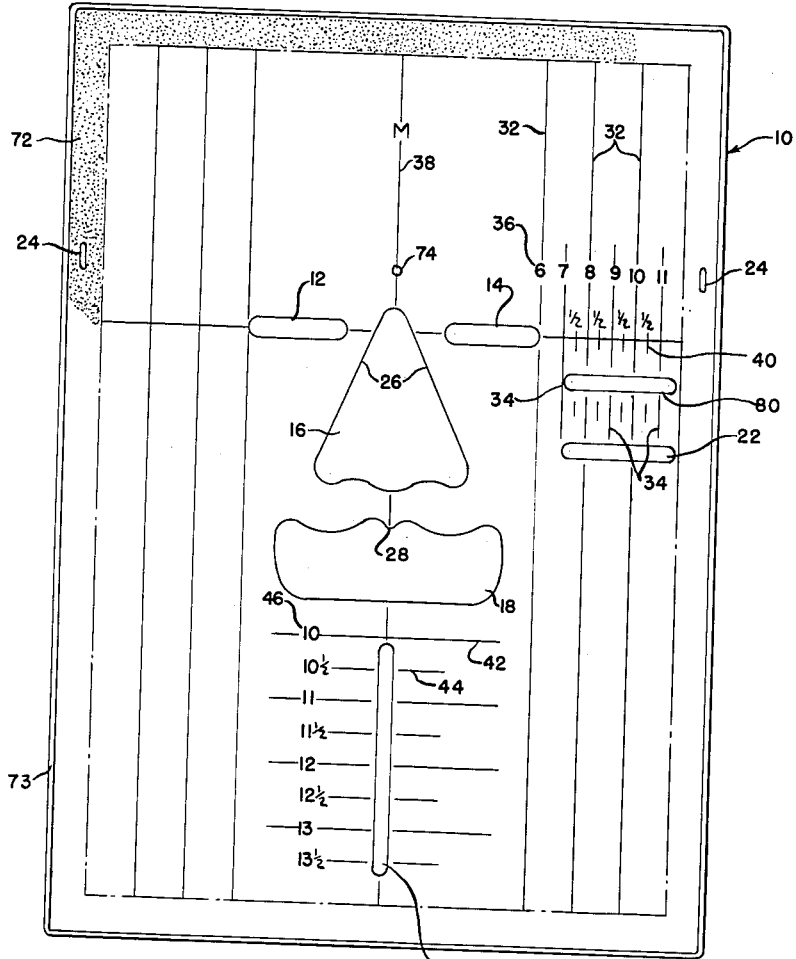
Fig. 3 is a plan or front view of the indicator or guide illustrated in Figs. 1 and 2.

From Figs. 1 and 3 particularly, it will be noted that the guide member 10 is provided with a plurality of width indicating gradient-like lines 32 which are parallel to each other and extend longitudinally of the longest dimension of the member 10, these lines being substantially vertical when the guide member is disposed in operative position as indicated in Figs. 1 and 2. The lines 32 are spaced apart approximately ⅝ inch and intermediate width indicating lines 34 are disposed accurately midway between the indicating lines 32. The spacing of the lines 32 and 34 is determined on the basis of a 1:16 ratio between the width of a patient's face and the width of the upper incisor teeth best suited to said patient. Further, indicia 36 comprising the numerals 6 through 11 are formed on the member 10 respectively to indicate the lines 32 and 34 as clearly shown in Figs. 1 and 3. The indicating lines 32 and 34 are spaced even units apart relative to the vertical median line 38 indicated "M" in said figures and the indicia 36 indicate the number of units any particular line is from the median line 38. Said indicia also indicate directly the width measurement, in millimeters, of the most suitable size of upper central teeth for the patient being observed. As is clearly shown in these figures, half size indicating lines 40 are also disposed between the lines 32 and 34 for purposes of making more precise width measurements.

The width measurements of the patient's face are made by observing the antero-temporal region of the patient's face which is directly rearward of the set of lines 32 and 34. The antero-temporal region is generally indicated 60 on the patient's face in Figs. 1 and 2, this region being directly posterior to the external border of the outer corner of the patient's eye. The distance between the opposite antero-temporal regions of the human face is considered to be the width of the face. The antero-temporal region may readily be observed through the transparent guide member 10 and the line 32 or 34, or the half-unit line 40 coinciding closest with the antero-temporal region 60 rearward of the set of width measuring lines on the guide member 10 establishes the width measurement of the most suitable central incisor tooth for the patient. For convenience, the indicia 36 are twice the actual measurement from the median line "M," since only one antero-temporal region need be observed and no multiplication is necessary.

The length of the upper central tooth most suitable for the patient is determined by a plurality of substantially horizontal lines 42 and parallel intermediate lines 44 having indicia 46 which directly indicate the length in millimeters of the central incisor teeth most suitable to the patient being observed. The line 42 or 44 nearest the base of the mandible and apex of the chin of the patient is observed to determine the length of the most suitable tooth in millimeters. This reading may be determined visually by direct reading by the dentist. However, such reading is facilitated by employing a chin bracket 48 having a shelf 50 which is substantially horizontal in normal use as clearly shown in Fig. 2. This shelf is moved vertically relative to the slot 20 until it engages the base of the mandible and apex of the chin of the patient. The line 42 or 44 nearest to the upper surface of the shelf 50 when disposed as just described will accurately indicate the most suitable length of teeth.

The chin bracket 48 is held in operative position relative to the guide member 10 by any suitable means such as washer 52 which is disposed over a threaded stud 54 extending forwardly from the bracket 48 and has a clamping nut 56 attached thereto. Also, a rectangular projection 58 preferably is formed on the bracket 48 so as to be slidably received within the slot 20 and thereby prevent tilting of the bracket 48 relative to the guide member 10 during vertical movement of the bracket. The projection 58 is also sufficiently long to extend into a slot 59 in washer 52 so as to prevent turning of the washer when nut 56 is being turned.

The shape or form of the patient's face may also readily be determined by the use of the guide member 10. One means of determining said shape comprises simply placing one of the side edges of the guide member 10 vertically against the antero-temporal region of the patient at one side of his face while holding the member substantially parallel to the face. Actually, the antero-temporal region comprises the apex of the zygomatic arch at the side of the face and the aforementioned edge of the guide member 10 is placed against said apex of the zygomatic arch and the upper portion of the bony structure of the head posterior to and above the temporal region. With a slight amount of practice, a dentist can readily determine whether the edge of the guide member 10 is substantially parallel to an imaginary median line extending vertically to the patient's face and, if it does, this will indicate that at least the upper portion of the patient's face is square in form. On the other hand, if the edge of the guide member 10 is inclined inward at the bottom towards said imaginary median line, this will indicate that the patient's face has a tapering form. Further, if said edge of the guide member 10 extends inward at the top towards said imaginary median line, this will indicate that the patient's face is of the ovoid type.

To determine whether a patient's face is of a compound shape such as square-tapering, etc., one edge of the guide member is disposed as aforesaid against the apex of the zygomatic arch and the upper portion of the bony structure of the head to determine the shape or form of the upper portion of the patient's face and said edge of the guide member is then pivoted relative to the apex of the zygomatic arch so as to dispose said edge of the guide member against said zygomatic arch and the bony structure of the jaw while holding the guide member substantially parallel to the face of the patient. If the edge of the guide member is disposed substantially parallel to the aforementioned imaginary median line of the face, the lower portion of the patient's face will be of square form or shape while, if the edge of the guide member extends inward at the bottom toward the imaginary median line, the lower portion of the face will be tapering. Other face forms or shapes may likewise be determined depending upon the inclination of the edge of the guide member when disposed against the aforementioned portions of the patient's face as is well known in accordance with the principles of face form and tooth harmony theory described above.

Figure 4:
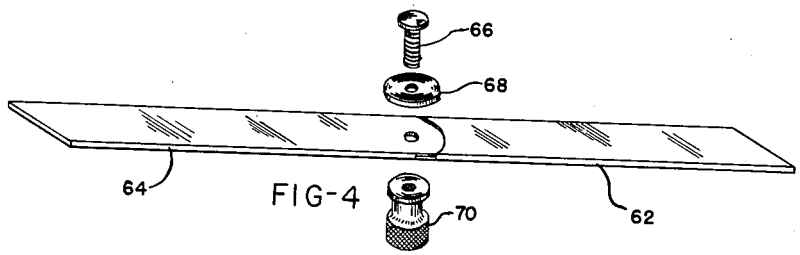
Fig. 4 is a perspective exploded view of face form or shape indicating means attachable to the guide illustrated in Fig. 3.

While the guide member 10 of the present invention may be used to determine the shape or form of a patient's face as described above, the determination of such shape or form is facilitated by employing auxiliary mechanical means such as one or more blades pivotally and slidably associated with the guide member 10 as shown particularly in Figs. 1 and 2. In these figures, a pair of blades 62 and 64 are pivotally connected at one end of each, said ends being formed preferably to comprise a half-together relation as shown in Fig. 4 so that the outer flat surfaces of the connected blades are in a common plane and resemble a continuous blade. A suitable bolt 66 extends through the over-lapping pivoted ends of the blades 62 and 64 and also through the slot 22. A spring washer 68 is also placed upon the bolt and a locking nut 70 is threaded onto the end of the bolt to secure the blades 62 and 64 in pivotal relationship to each other and to the guide member 10. The pressure exerted by the spring washer 68 is relatively light so that the blades may be moved longitudinally of the slot 22 and the blades may also be easily pivoted relative to each other and to the guide member 10 but any adjusted position of the blades is releasably maintained while making observations or readings.

The blades 62 and 64 are used to aid the dentist, if desired, in making width measurements of the patient's face as well as for determining the shape or form of his face. To determine the width of the face, the upper blade 62 particularly is moved relative to the slot 22, while the guide member 10 is held in operative position, until the left hand edge of the blade 62, as viewed in Fig. 1, is disposed in alignment with the antero-temporal region of the right hand side of the patient's face. The vertical indicating line nearest said left hand edge of the blade is then observed and the indicia 36 of said line is noted to determine directly in millimeters the width of the most suitable central inscisor tooth for said patient. During such observations, it is necessary that the blade 62 be maintained parallel to the vertically disposed indicating lines 32 so that accurate measurement may be made. For purposes of measuring the width of the teeth, the lower blade 62 plays no part.

The lines 32, 34, 42, 44, etc. for indicating width and length of teeth, as well as indicia 36 and 46 therefor which are placed on the guide member 10, may be formed in any desirable manner such as by printing or molding in either intaglio or raised fashion, said molding being accomplished simultaneously with the formation of the guide member. Further, in the preferred embodiment of the invention, the guide member 10 is provided with a clouded or frosted appearing border 72 as clearly shown in Figs. 1 and 3. Such border aids in the observation made by the dentist by more precisely outlining the face of the patient being observed and such border also improves the esthetic appearance of the guide member. Strength is also imparted to the guide member, as well as easier handling being afforded, by forming a molded flange rim 73 around the perimeter of said member 10.

In order to facilitate the determination of the shape or form of the patient's face, the blades 62 and 64 are moved as described above relative to the slot 22 and the blades respectively are pivoted about the bolt 66 until the upper blade 62 is observed to be along a line extending between the antero-temporal region 60 (apex of the zygomatic arch) and the upper portion of the bony structure of the head posterior to and above the temporal region. The lower blade 64 is then moved until the intermediate portion of the left hand edge as viewed in Fig. 1 appears to be disposed in line with the jaw bone of the patient. Observation is then made as to the disposition of the blades 62 and 64 relative to the right hand edge of the guide member 10 as viewed in Fig. 1 and from such disposition of the blades the shape or form of the patient's face is readily and accurately determined.

By way of example, in Fig. 1, the upper blade 62 is disposed substantially parallel to the right hand edge of the guide member while the lower blade 62 extends inward toward the median line 38 of the guide member, thus indicating from the upper blade that the upper portion of the patient's face is square while the lower portion is tapering. The shape of the face of the illustrated patient is thus noted to be square-tapering.

Knowing the width and length measurements of the central incisor teeth best suited for any individual patient, as well as the shape or form of the patient's face, any suitable anterior tooth may be determined since artificial anterior teeth are made in sets and the size of the lateral and cuspid teeth are proportioned to the upper central teeth in precise relationship. Said sets of teeth are designated in the profession by mold numbers which are arbitrarily assigned thereto by the manufacturer and dentists are familiar with these numbers so that they can accurately order the exact mold number they desire for an individual patient. The measurements of the teeth, in millimeters, of any selected mold number are readily determined from data sheets and books furnished dentists by tooth manufacturers and thus the dentist may order substantially the exact size of anterior tooth needed for any individual patient as determined by measurements made while using the guide member comprising the present invention. Both the length and width of the teeth are determined as above described.

Further, the aforementioned sets of anterior teeth are fashioned in certain shapes to harmonize with the shape or form of an individual patient's face. For practical purposes, these sets of teeth are chiefly made in three different shapes designated respectively as square, tapering and ovoid and said shapes correspond to the face forms referred to above. Thus, a dentist not only needs to determine the width and length of a tooth but also the shape or form best suited to an individual patient and such shape or form is likewise easily and quickly determined by using the guide comprising the present invention.

In order that the blade 62 may not accidentally be pivoted counter-clockwise as viewed in Fig. 1 and strike the patient's nose projecting through the aperture 16, a suitable stop 74 in the form of a short projection extending forwardly from the outer surface of the guide member 10 is integrally molded thereto. The bolt 54 or nut 56 will serve as a stop to prevent the lower blade 62 from being pivoted clockwise into engagement with the patient's nose. Thus, no discomfort will be experienced by the patient if either of the blades should accidentally be moved in the direction of his nose when projecting through the aperture 16.

Figure 5:
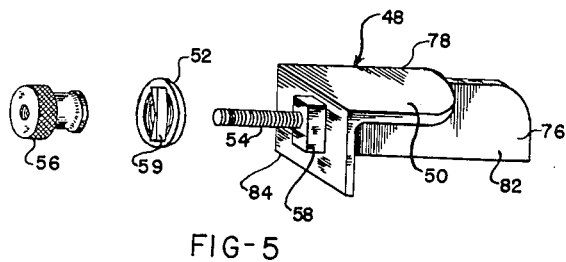
Fig. 5 is a perspective exploded view of a chin engaging member attachable to the indicator or guide illustrated in Fig. 3.

As an additional means for measuring the width of a patient's face, the present invention also includes a blade 76 which is fixed to the chin bracket 48 as shown in Fig. 5. Said blade is disposed along the edge 78 of shelf 50 and is preferably flush therewith, as well as somewhat longer than said shelf, but the blade will not interfere with the use of the bracket when being used to measure face lengths. In view of the blade 76, the bracket 48 may also be used to measure the width of a patient's face.

To accomplish width measurement, the guide member 10 is provided with a slot 80, shown in Figs. 1 and 3, which is similar and parallel to slot 22 but above the latter. The bracket 48 is positioned relative to slot 80 so that the projection 58 projects through the slot 80 and prevents turning of the bracket relative to the guide member. The blade 76 extends horizontally rearward from the guide member 10 and the bracket 48 is then slidably moved relative to slot 80 so that the longest edge 82 of the blade 76 is brought into contact with the zygomatic arch in the antero-temporal region 60 of the patient as shown in dotted lines in Fig. 2. Nut 56 is then turned to clamp the bracket in that position. The line 34 or 40 nearest the edge 84 of the bracket 48, which is in the same plane as edge 82 of blade 76, indicates the width of the patient's face and the indicia 36 corresponding to said line will correspond, in millimeters, to the width of the upper central tooth best suited to said patient. In this regard, the function of the bracket 48 is the same as that of blade 62 when used to determine the width of a patient's head. However, it will be seen that the bracket 48 serves the double function of aiding in measuring both the length and width of upper central teeth required by any individual patient.

While the invention has been shown and illustrated in its several preferred embodiments, and has included certain details, it should be understood that the invention is not to be limited to the precise details herein illustrated and described since the same may be carried out in other ways falling within the scope of the invention as claimed.

We claim:

1. A tooth selector guide comprising a substantially flat and transparent member arranged to be disposed against a patient's face and substantially parallel thereto, said member having therein a pair of spaced openings arranged to be disposed in concentricity with the pupils of the eyes of a patient to orient the member in a vertical direction relative to a patient's face and another opening outlined by a continuous edge and arranged to receive therethrough the nose of said patient, an indicator on said member arranged to be aligned with the septum of said patient's nose to orient the member in a transverse direction relative to said patient's face, one series of indicia positioned on said member between the center and one side edge thereof and extending vertically in use and spaced in a horizontal direction in ratio to face width to indicate tooth width, and another series of indicia on said member extending horizontally in use and positioned thereon between the center and lower edge thereof and spaced in a vertical direction in ratio to face length to indicate tooth length, said indicia respectively being viewable relative to the sides and chin of the face of said patient and directly readable to determine the width and length of teeth suitable for said patient.

2. A tooth selector guide comprising a transparent member positionable substantially concentrically with and adjacent the face of a patient and having a slot therein which extends horizontally when said member is in use, means on said member operable to orient said member relative to the face of said patient to establish a basis of tooth measurement, one series of indicia positioned on said member between the center and one side edge thereof and extending vertically in use and spaced in a horizontal direction in ratio to face width to indicate tooth width, and another series of indicia on said member extending horizontally in use and positioned thereon between the center and lower edge thereof and spaced in a vertical direction in ratio to face length to indicate tooth length, said indicia respectively being viewable relative to the sides and chin of the face of the patient and readable directly to determine the length and width of teeth suitable for said patient, blade-like means, and blade supporting means extending through said slot and movable with said blade relative to said slot and one side of said patient's head to indicate the face form of said patient and facilitate the reading of said one series of indicia to indicate tooth width.

3. A tooth selector guide comprising a substantially flat and transparent member positionable against the face of a patient and having a pair of slots therein disposed approximately at a right angle to each other, one of said slots being horizontal and the other vertical when said member is operatively positioned on said patient's face, means on said member operable to orient said member relative to the face of said patient, one series of indicia positioned on said member between the center and one side edge thereof and extending vertically in use and spaced in a horizontal direction in ratio to face width to indicate tooth width, and another series of indicia on said member extending horizontally in use and positioned thereon between the center and lower edge thereof and spaced in a vertical direction in ratio to face length to indicate tooth length, said indicia respectively being arranged on said member adjacent said slots, blade-like means supported by said member for movement relative to said horizontal slot and said one series of indicia to permit said means to be aligned relative to one side of said patient's face, and a chin bracket movable relative to said vertical slot and said another series of indicia and disposable against the underside of the chin of said patient, said blade-like means and chin bracket facilitating the reading of said indicia to determine the width and length of teeth suitable for said patient.

4. A tooth selector guide comprising a substantially flat and transparent member arranged to be placed against a patient's face and substantially parallel thereto, means on said member operable to orient said member relative to the face of said patient to establish a basis of tooth measurement, said member also having a vertical slot in the lower portion of the member when positioned for use and a horizontal slot near one side edge of said member, one series of indicia positioned on said member between the center and one side edge thereof and extending vertically in use and spaced in a horizontal direction in ratio to face width to indicate tooth width, and another series of indicia on said member extending horizontally in use and positioned thereon between the center and lower edge thereof and spaced in a vertical direction in ratio to face length to indicate tooth length, said indicia respectively being arranged on said member adjacent said horizontal and vertical slots, and a bracket having means arranged to extend selectively through said slots to support said bracket for sliding movement relative to said member and said indicia, said bracket having one means thereon arranged to engage the chin of said patient to measure facial length when said bracket is mounted for movement relative to said vertical slot and said bracket also having a second means arranged to engage a portion of the side of said patient's face to measure facial width when said bracket is mounted for movement in said horizontal slot.

5. A tooth selector guide comprising a transparent and substantially flat member positionable in use substantially vertically against a patient's face, means on said member operable to effect orientation of said member with certain significant objects on a patient's face to establish said member in both vertical and horizontal directions relative to said objects and thereby provide a basis for tooth measurement, said member being sufficiently wide to extend at least from the center of a patient's face to the side thereof and sufficiently long to extend from the eyes to the chin of said patient, a series of indicia positioned on said member horizontally and in use extending from adjacent the patient's eyes to a location past the side of the patient's head, another series of indicia on said member extending vertically in use from adjacent a patient's mouth to a position below the chin of a patient, said series of indicia respectively being spaced apart in ratio to face width and face length and respectively indicating directly the width and length of teeth for said patient, said member having slots therein adjacent said rows of indicia and respectively extending horizontally and vertically in the use of said selector guide, and elongated means including members extending through said slots for guidance and said means being movable relative to said member and said rows of indicia so as to be disposed respectively opposite the side of the face and chin of a patient, thereby to facilitate the reading of said indicia to determine the size of teeth suitable for said patient.

References Cited in the file of this patent

UNITED STATES PATENTS

| | | |
|---|---|---|
| D. 142,608 | Ziegfield | Oct. 16, 1945 |
| 1,323,697 | King | Dec. 2, 1919 |
| 1,378,527 | Dalbey | May 17, 1921 |
| 1,378,745 | Wavrin | May 17, 1921 |
| 1,679,927 | Bell | Aug. 7, 1928 |
| 1,899,318 | Dixon | Feb. 28, 1933 |
| 2,043,230 | Boll | June 9, 1936 |
| 2,048,989 | Baribeau | July 28, 1936 |
| 2,326,030 | Hearn | Aug. 3, 1943 |
| 2,499,518 | Markham | Mar. 7, 1950 |
| 2,557,428 | Grostic | June 19, 1951 |
| 2,557,965 | Hilsenrath | June 26, 1951 |